United States Patent
Abedini et al.

(10) Patent No.: US 12,004,092 B2
(45) Date of Patent: Jun. 4, 2024

(54) POWER CONTROL TECHNIQUES FOR A COMMUNICATION SYSTEM THAT INCLUDES A REPEATER

(71) Applicant: QUALCOMM Incorporated, San Diego, CA (US)

(72) Inventors: Navid Abedini, Basking Ridge, NJ (US); Junyi Li, Franklin Park, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/213,639

(22) Filed: Mar. 26, 2021

(65) Prior Publication Data
US 2021/0306962 A1  Sep. 30, 2021

Related U.S. Application Data

(60) Provisional application No. 63/002,832, filed on Mar. 31, 2020.

(51) Int. Cl.
*H04W 52/52* (2009.01)
*H04B 1/04* (2006.01)
(Continued)

(52) U.S. Cl.
CPC ............ *H04W 52/52* (2013.01); *H04B 1/04* (2013.01); *H04B 7/155* (2013.01); *H04W 52/18* (2013.01); *H04B 2001/0416* (2013.01)

(58) Field of Classification Search
CPC ...... H04B 7/14–17; H04B 1/04; H04B 7/155; H04B 2001/0416; H04W 52/18; H04W 52/52
See application file for complete search history.

(56) References Cited

U.S. PATENT DOCUMENTS

| 8,849,186 B2 * | 9/2014 | Gore | .................. H04W 84/047 370/310 |
| 2005/0068902 A1 * | 3/2005 | Rath | ..................... H04W 84/02 370/256 |

(Continued)

FOREIGN PATENT DOCUMENTS

WO   2018203738 A1   11/2018

OTHER PUBLICATIONS

International Search Report and Written Opinion—PCT/US2021/024792—ISA/EPO—dated Jun. 22, 2021.

*Primary Examiner* — Raymond S Dean
(74) *Attorney, Agent, or Firm* — Harrity & Harrity, LLP

(57) ABSTRACT

This disclosure generally relates to systems, devices, apparatuses, products, and methods for wireless communication. For example, a communication system may include a repeater that relays communications between communication devices. The repeater determines one or more power configuration parameters associated with the repeater and transmits the one or more power configuration parameters to a controlling node, such as a base station or other entity. The repeater receives, from the controlling node, gain configuration information determined based on the one or more power configuration parameters. A repeater may receive a communication, determine a gain value based on the gain configuration information, and apply the gain value to the received communication to create a gain adjusted communication for transmission to another device.

30 Claims, 8 Drawing Sheets

(51) Int. Cl.
  *H04B 7/155* (2006.01)
  *H04W 52/18* (2009.01)

(56) References Cited

U.S. PATENT DOCUMENTS

| | | | | |
|---|---|---|---|---|
| 2005/0220217 | A1* | 10/2005 | Yamawaki | H03F 1/02 |
| | | | | 375/297 |
| 2008/0064354 | A1* | 3/2008 | Lee | H04W 52/242 |
| | | | | 455/187.1 |
| 2010/0173667 | A1* | 7/2010 | Hui | H04W 88/06 |
| | | | | 455/552.1 |
| 2011/0014911 | A1* | 1/2011 | Baldemair | H04B 7/2606 |
| | | | | 455/434 |
| 2011/0256877 | A1* | 10/2011 | Hoymann | H04B 7/155 |
| | | | | 455/445 |
| 2012/0058719 | A1* | 3/2012 | Gan | H04W 52/46 |
| | | | | 455/10 |
| 2012/0113834 | A1* | 5/2012 | Hunzinger | H04B 7/15535 |
| | | | | 370/252 |
| 2012/0196528 | A1 | 8/2012 | Kazmi et al. | |
| 2013/0077556 | A1* | 3/2013 | Gore | H04B 7/15578 |
| | | | | 370/315 |
| 2015/0003300 | A1* | 1/2015 | Bandoh | H04L 5/14 |
| | | | | 370/279 |
| 2020/0146059 | A1* | 5/2020 | Cirik | H04L 5/001 |
| 2020/0163028 | A1 | 5/2020 | Chae et al. | |
| 2020/0266958 | A1* | 8/2020 | Liu | H04L 5/0092 |
| 2020/0280887 | A1* | 9/2020 | Abedini | H04W 56/001 |
| 2020/0322037 | A1* | 10/2020 | Abedini | H04W 24/10 |

\* cited by examiner

POWER CONTROL TECHNIQUES FOR A COMMUNICATION SYSTEM THAT INCLUDES A REPEATER

CLAIM OF PRIORITY

The present Application for Patent claims priority to U.S. Provisional Patent Application No. 63/002,832, entitled "Power Control Techniques for a Communication System That Includes a Repeater," filed Mar. 31, 2020, which is expressly incorporated by reference herein.

TECHNICAL FIELD

This disclosure relates generally to wireless communications, and more specifically, to power control within a repeater communication system.

DESCRIPTION OF THE RELATED TECHNOLOGY

Wireless communications systems are widely deployed to provide various types of communication content such as voice, video, packet data, messaging, broadcast, and other types of content. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes that may simultaneously support communication for multiple communication devices (e.g., user equipment (UE)).

Some wireless signals transmitted within a wireless communication system may be limited by path-loss through the air, physical blockers, or other constraints. To address this issue, wireless communications systems may use wireless repeaters for repeating and extending signals sent between various system nodes. A signal received at a repeater may be a signal transmitted by a base station intended for a UE, a signal transmitted by a UE intended for a base station, a signal transmitted by one UE intended for another UE, or a signal transmitted by one base station intended for another base station.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
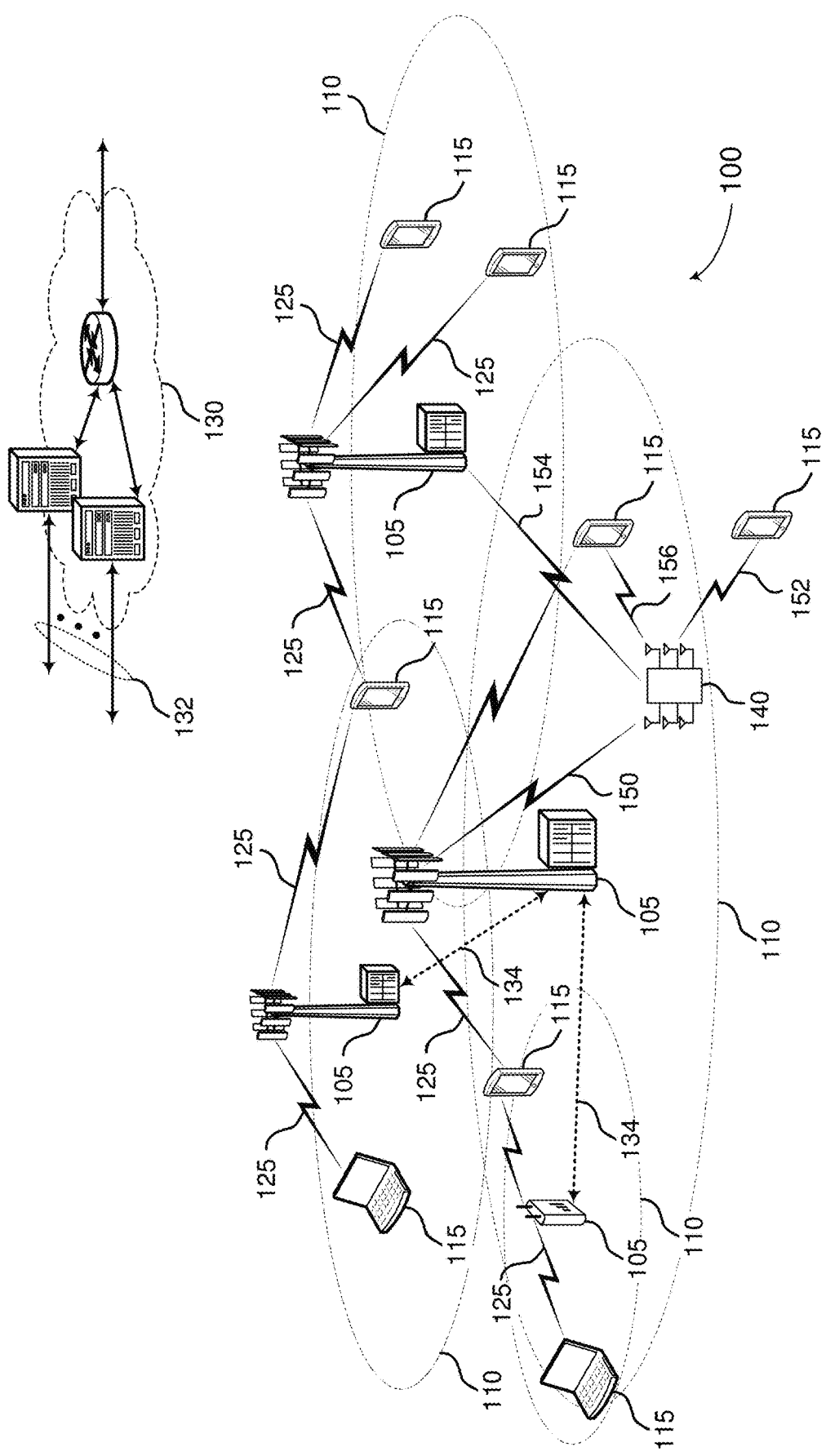
FIG. 1 illustrates an example of a system for wireless communication that supports one or more repeaters in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for controlling gains and/or transmission power within a repeater communication system. A repeater in a repeater communication system serves to relay communications between a first device (e.g., a base station, user equipment (UE), or another repeater) and a second device (e.g., a base station, UE, or another repeater). In one example, the repeater receives and forwards a downlink signal sent from a base station intended for a UE. In another example, the repeater receives and forwards an uplink signal sent from a UE intended for a base station.

One issue that may arise in a repeater communication system is how to control transmission power levels at the various nodes in the system. In one implementation, to enable power control in the system, the various system nodes may exchange control messages that provide information related to power control to a controlling node. The controlling node may use this information as part of a closed-loop power control scheme to select appropriate transmission power levels and/or gain setting levels for one or more nodes in the system to achieve desired system performance characteristics. As will be discussed in the examples below, the controlling node for the power control scheme described herein may be a base station, a UE, a repeater, a network node/function, a cloud-based management entity, or any other control entity. Where the description herein discusses certain implementations with a base station performing actions related to configuring the gain values at the repeater, other example implementations may use other types of controlling nodes to configure the repeater in the same or similar manner.

In an example system where a base station and UE communicate through a repeater, the UE and/or repeater may provide information related to power control to the base station (or other control entity). The base station may then use this information to coordinate an end-to-end power-controlled communication path. For a downlink signal, in one implementation, the base station may dynamically set its own transmission power level to a desired level, dynamically set a gain level at the repeater to a desired level, or both, to achieve a target receive power at the UE. For an uplink signal, in another implementation, the base station may dynamically set the transmission power level of the UE to a desired level, dynamically set a gain level at the repeater to a desired level, or both, to achieve a target receive power at the base station. The transmission power level selections and/or the gain level selections by the base station may be based at least in part on information provided to the base station from the repeater and/or the UE (or other system nodes). In some implementations, this closed-loop power control technique provides multiple possible adjustment points along a communication path for the base station to customize a coordinated approach to power control. This coordinated approach may balance potentially competing goals throughout the system, such as saving power at certain devices (e.g., battery-powered devices), managing interference, or meeting a desired link budget. Further details of the disclosed power control techniques will be discussed below (see, e.g., FIGS. 5-9).

FIG. 1 illustrates an example of a wireless communications system 100 that includes one or more repeaters 140 in accordance with aspects of the present disclosure. The wireless communications system 100 includes one or more repeater 140, one or more base stations 105, one or more UEs 115, and one or more core networks 130. In some examples, the wireless communications system 100 may be a Long Term Evolution (LTE) network, an LTE-Advanced (LTE-A) network, an LTE-A Pro network, a fifth generation (5G) New Radio (NR) network, or another type of network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a wireless communication device, a communication device, a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130 or via a repeater 140).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as "FR2") that exists above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, a base station 105, UE 115, or repeater 140 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a repeater 140), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, UE 115, or repeater 140) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115, another base station 105, or a repeater 140. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115 or repeater 140) a beam direction for subsequent transmission and/or reception by the base station 105. Additionally, a UE 115 or repeater 140 may perform similar beamforming operations (as described herein for the base station 105) for directional communications with other devices (e.g., a base station, a UE, or another repeater).

Some signals, such as data signals associated with a particular receiving device, may be transmitted by a base station 105 in a single beam direction (e.g., a direction associated with the receiving device, such as a repeater 140). In some examples, the beam direction associated with transmissions along a single beam direction may be determined based at least in in part on a signal that was transmitted in different beam directions. For example, a repeater 140 may receive one or more of the signals transmitted by the base station 105 in different directions, and the repeater 140 may report to the base station 105 an indication of the signal it received with a highest signal quality, or an otherwise acceptable signal quality. Although these techniques are described with reference to signals transmitted in one or more directions by a base station 105, a UE 115 or repeater 140 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115 or repeater 140, which may be examples of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 or a repeater 140 may have one or more antenna arrays that may support various MIMO or beamforming operations.

An individual node (e.g., base station, UE, or repeater) within the wireless communications system 100 may include multiple different communication interfaces each configured for a different type of communication protocol. As one example, a base station 105, a UE 115, or a repeater 140 may include both a wide area network interface (e.g., 4G or 5G cellular) and a local area network interface (e.g., IEEE 802.11 Wi-Fi, or Bluetooth). As another example, a base station 105, a UE 115, or a repeater 140 may include both a high frequency network interface (e.g., mmWave) and a lower frequency network interface that uses a lower frequency band than the mmWave interface (e.g., LTE, sub-6 GHz NR, Wi-Fi, Bluetooth, etc.).

Wireless communications system 100 may include one or more wireless repeaters 140 (also known as a relay or a hybrid node). The repeaters 140 may include functionality of base station 105 and/or UE 115 for repeating, forwarding, relaying, extending, and/or redirecting wireless signals. In some cases, a repeater 140 may be used in line of site (LOS) or non-line of sight (NLOS) scenarios. In a LOS scenario, transmissions, such as mmW transmissions, may be limited by path-loss through air, which may be overcome using beamforming techniques at the wireless repeater 140. In a NLOS scenario, such as in an urban area or indoors, mmW transmissions may be limited by signal blocking or signal interfering physical objects.

The repeater 140 may provide an uplink path from a UE to a base station, a downlink path from a base station to a UE, a P2P or D2D path from one UE to another UE, and/or a wireless backhaul path between the base station and a core network device (e.g., via one or more other base stations). In a first example, a mmW beamforming repeater 140 may be utilized to receive a signal from a base station 105 and transmit the signal to the UE 115, such as by receiving the signal on wireless link 150 and then transmitting the signal on wireless link 152. In a second example, a mmW beamforming repeater 140 may be utilized to receive a signal from a UE 115 and transmit the signal to the base station 105, such as by receiving the signal on wireless link 152 and then transmitting the signal on wireless link 150. In a third example, a mmW beamforming repeater 140 may be utilized to receive a signal from one base station 105 and transmit the signal to a different base station 105 (e.g., in a wireless backhaul configuration), such as by receiving the signal on wireless link 150 and then transmitting the signal on wireless link 154. In a fourth example, a mmW beamforming repeater 140 may be utilized to receive a signal from one UE 115 and transmit the signal to a different UE 115 (e.g., in a P2P or D2D protocol configuration), such as by receiving the signal on wireless link 152 and then transmitting the signal on wireless link 156. In each of these examples, the signal transmitted may be a processed version of the received signal (e.g., an amplified version of the received signal with or without further processing such as signal phase shifting, splitting, and/or combining). Beamforming and gain control techniques may be utilized to improve signal quality between the base station 105, repeater 140, and UE 115 by isolating signals (e.g., via beamforming) and improving or maintaining stability within a signal processing chain of the repeater (e.g., via gain control).

The repeater 140 may include an array of reception antennas and an array of transmission antennas. In some cases, the array of reception antennas and the array of transmission antennas comprise the same set of dual-pole antennas, wherein the dual pole antennas function in a first polarization as the array of reception antennas and the dual pole antennas function in a second polarization as the array of transmission antennas. In some cases, the antennas comprise meta-material antennas or antenna arrays. The repeater 140 may further include a beam control system, which may comprise a processor or system on chip (SoC) for controlling transmit and/or receive beams to reduce signal interference caused by retransmission.

In some cases, the repeater 140 is an analog RF repeater, and the repeater 140 may include a signal processing chain connected (e.g., coupled, linked, attached) between the array of reception of antennas and the array of transmission antennas. The signal processing chain may be implemented as a radio frequency integrated circuit (RFIC), which may include RF/microwave components such as one or more phase shifters, (low noise amplifiers) LNAs, (power amplifiers) PAs, PA drivers, gain controllers, power detectors, or other circuitry. The phase shifters may be controlled by one or more beam controllers for beamforming to reduce signal interference. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming and gain control, signal quality (e.g., mmW signals) may be improved in LOS and NLOS scenarios.

As described, the repeater 140 may include components (e.g., antenna arrays and signal processing chain circuitry) in the analog/RF domain. Accordingly, in some implementations, the repeater may not include any digital components for certain features described herein. For example, the repeater, in some implementations, may not include any digital signal processing functionality that would allow the repeater to decode and interpret the contents of a received mmW signal. As another example, the repeater, in some implementations, may not include any digital signal processing functionality that would allow the repeater to generate new content for a mmWave signal to be sent to another device. In some cases, the repeater may include one or more side channel components that allow the repeater to decode and interpret other types of messages (e.g., non-mmW signals). For example, the repeater may include a side channel communication interface for sending or receiving control messages. Incoming control messages may include power control messages from a base station 105 or another device, such as instructions regarding a gain to be applied at the repeater or an output power to be used by the repeater. Outgoing control messages may include gain configuration information of the repeater to be sent to the base station. Example side channel communication interfaces may be implemented using one or more of Bluetooth, ultra-wide band, wireless LAN (e.g., IEEE 802.11 Wi-Fi), LTE, or sub-6 GHz NR protocols (or other wireless communication protocols). As such, the repeater may include circuitry and/or processors for transmitting, receiving, and/or processing signals via those protocols and controlling gain levels or output power levels based on those signals one the side channel communication interface.

Figure 2:
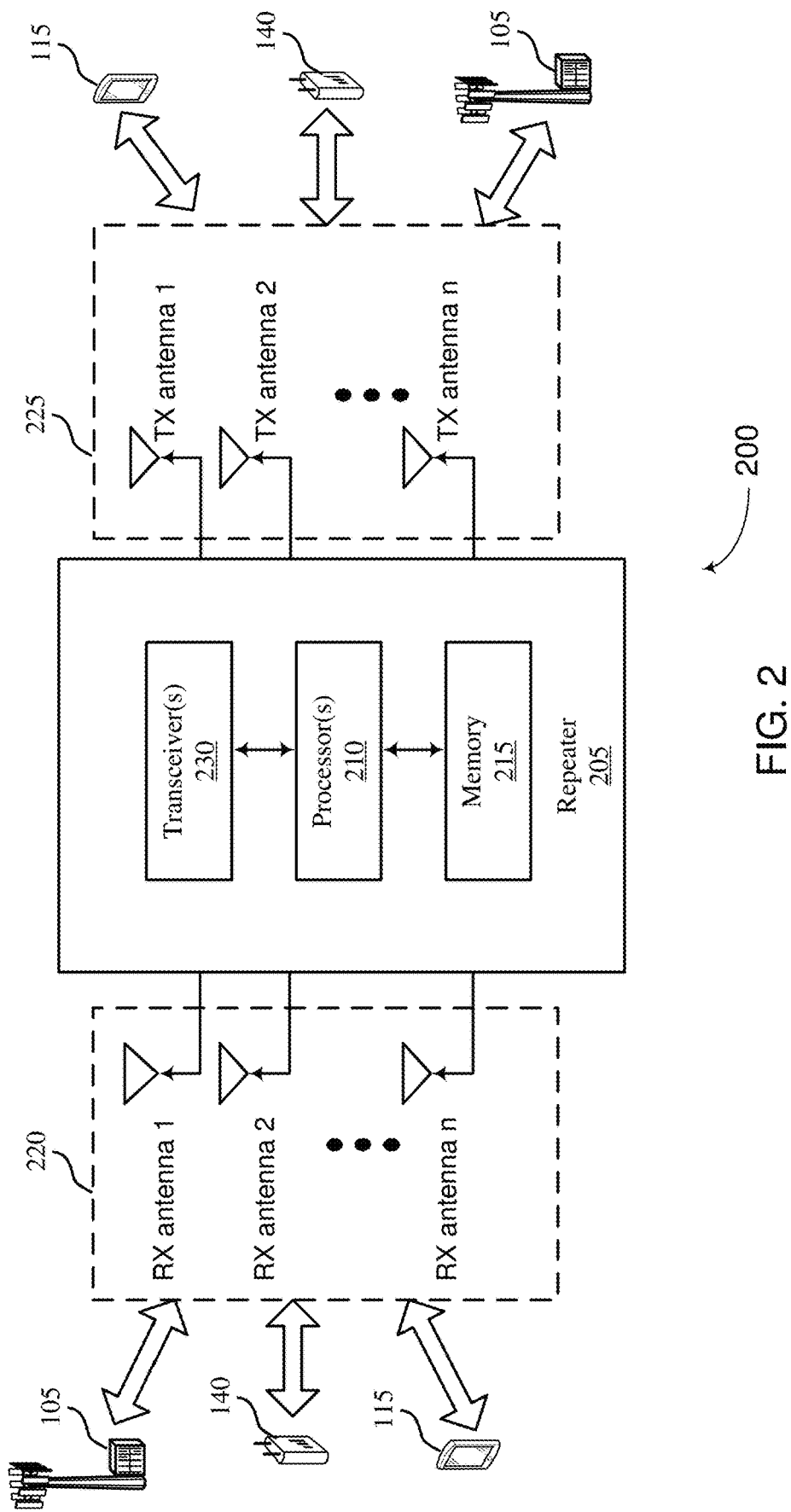
FIG. 2 illustrates an example block diagram of a repeater.

FIG. 2 illustrates an example block diagram 200 of a repeater 205. In some examples, the devices of FIG. 2 may implement aspects of wireless communications system 100, and the repeater 205 may be an example of the repeater 140 of FIG. 1. The repeater 205 includes a reception antenna array 220 including a set of antennas and a transmission antenna array 225 including a set of antennas. In some cases, the reception antenna array 220 and the transmission antenna array 225 are the same antenna arrays including the same set of dual pole antennas functioning in first and second polarizations as the reception and the transmission antenna array. In other cases, the reception antenna array 220 and the transmission antenna array 225 are physically separate arrays. In some cases, the reception antenna array 220 and/or the transmission antenna array 225 comprise meta-material antennas.

The repeater 205 may further include one or more processors 210, memory 215, and one or more transceivers 230. The processor is 210 is coupled with the memory 215, where the processor 210 executes instructions stored on the memory 215 to implement the various functions performed by the repeater 205 described herein. The one or more transceivers 230 may include multiple transceivers to support multiple communication interfaces. In one example, one transceiver may support a first communication technology (e.g., mmWave interface) while another transceiver may support as second communication technology (e.g., a non-mmWave interface, such as an interface associated with LTE, sub-6 GHz NR, Wi-Fi, Bluetooth, etc.). The non-mmWave interface may use a frequency range that is lower than a frequency range associated with the mmWave interface. In another example, one transceiver may support a first radio access technology (RAT) while another transceiver may support a second RAT different than the first RAT.

In some implementations, the repeater 205 uses a first transceiver for sending and/or receiving control messages (e.g., exchanging control messages with a base station), and the repeater 205 uses a second transceiver for sending and/or receiving other signals when the repeater 205 is acting as an amplifying intermediary or relay between two other devices. As one example of using the second interface for relayed signals, the repeater 205 may receive signals from a base station 105 via the second transceiver (associated with a second communication interface of the repeater 205) according to a beamforming configuration and retransmit the signals to a UE 115 via the second transceiver (associated with the second communication interface) according to a beamforming configuration. The repeater 205 may further receive signals from a UE 115 via the second transceiver (associated with the second communication interface) according to a beamforming configuration and retransmit the signals to a base station 105 via the second transceiver (associated with the second communication interface) according to a beamforming configuration. As such, the repeater 205 may function to implement uplink and downlink communications. The repeater 205 may also receive signals from one base station 105 via the second transceiver (associated with the second communication interface) according to a beamforming configuration and retransmit the signals to a different base station 105 via the second transceiver (associated with the second communication interface) according to a beamforming configuration (e.g., for wireless backhaul). The repeater 205 may also receive signals from one UE 115 via the second transceiver (associated with the second communication interface) according to a beamforming configuration and retransmit the signals to a different UE 115 via the second transceiver (associated with the second communication interface) according to a beamforming configuration (e.g., D2D or P2P). Additionally, the repeater 205 may also receive signals from another repeater 140 via the second transceiver (associated with the second communication interface) or send signals to another repeater 140 via the second transceiver (associated with the second communication interface) according to a receive and/or transmit beamforming configuration (e.g., in a multi-hop repeater path).

Figure 3:
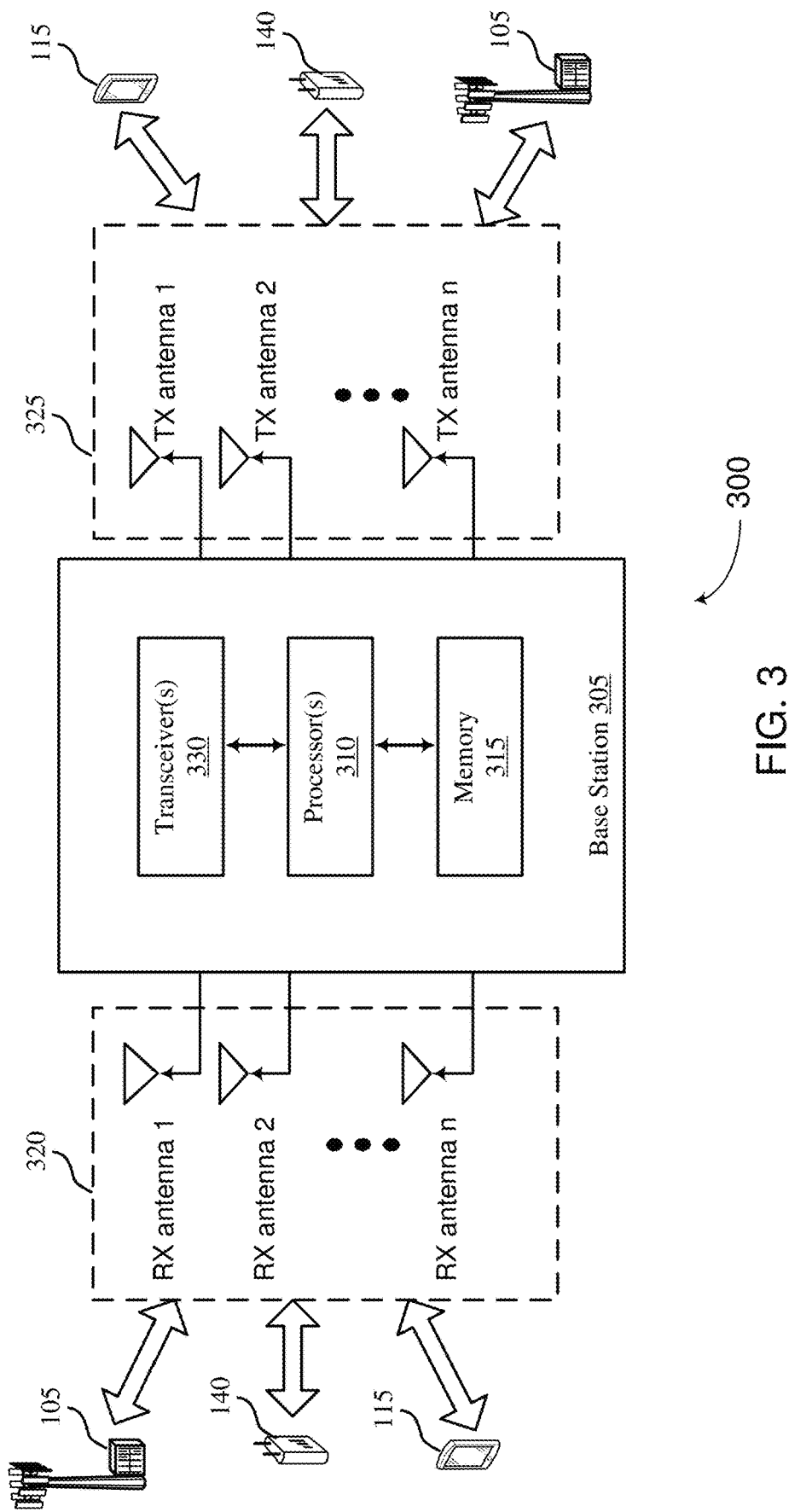
FIG. 3 illustrates an example block diagram of a base station.

FIG. 3 illustrates an example of a block diagram 300 of a base station 305 in accordance with aspects of the present disclosure. In some examples, the devices of FIG. 3 may implement aspects of wireless communications system 100, and the base station 305 may be an example of the base station 105 of FIG. 1. The base station 305 includes a reception antenna array 320 including a set of antennas and a transmission antenna array 325 including a set of antennas. The antenna arrays 320 and 325 may receive signals from, and transmit signals to, various other communication devices, including UEs 115, repeaters 140, and/or other base stations 105.

The base station 305 may further include one or more processors 310, memory 315, and one or more transceivers 330. The processor is 310 is coupled with the memory 315, where the processor 310 executes instructions stored on the memory 315 to implement the various functions performed by the base station 305 described herein. The one or more transceivers 330 may include multiple transceivers to support multiple communication interfaces. In one example, one transceiver may support a first communication technology (e.g., mmWave interface) while another transceiver may support as second communication technology (e.g., a non-mmWave interface, such as an interface associated with LTE, sub-6 GHz NR, Wi-Fi, Bluetooth, etc.). The non-mmWave interface may use a frequency range that is lower than a frequency range associated with the mmWave interface. In another example, one transceiver may support a first radio access technology (RAT) while another transceiver may support a second RAT different than the first RAT.

Figure 4:
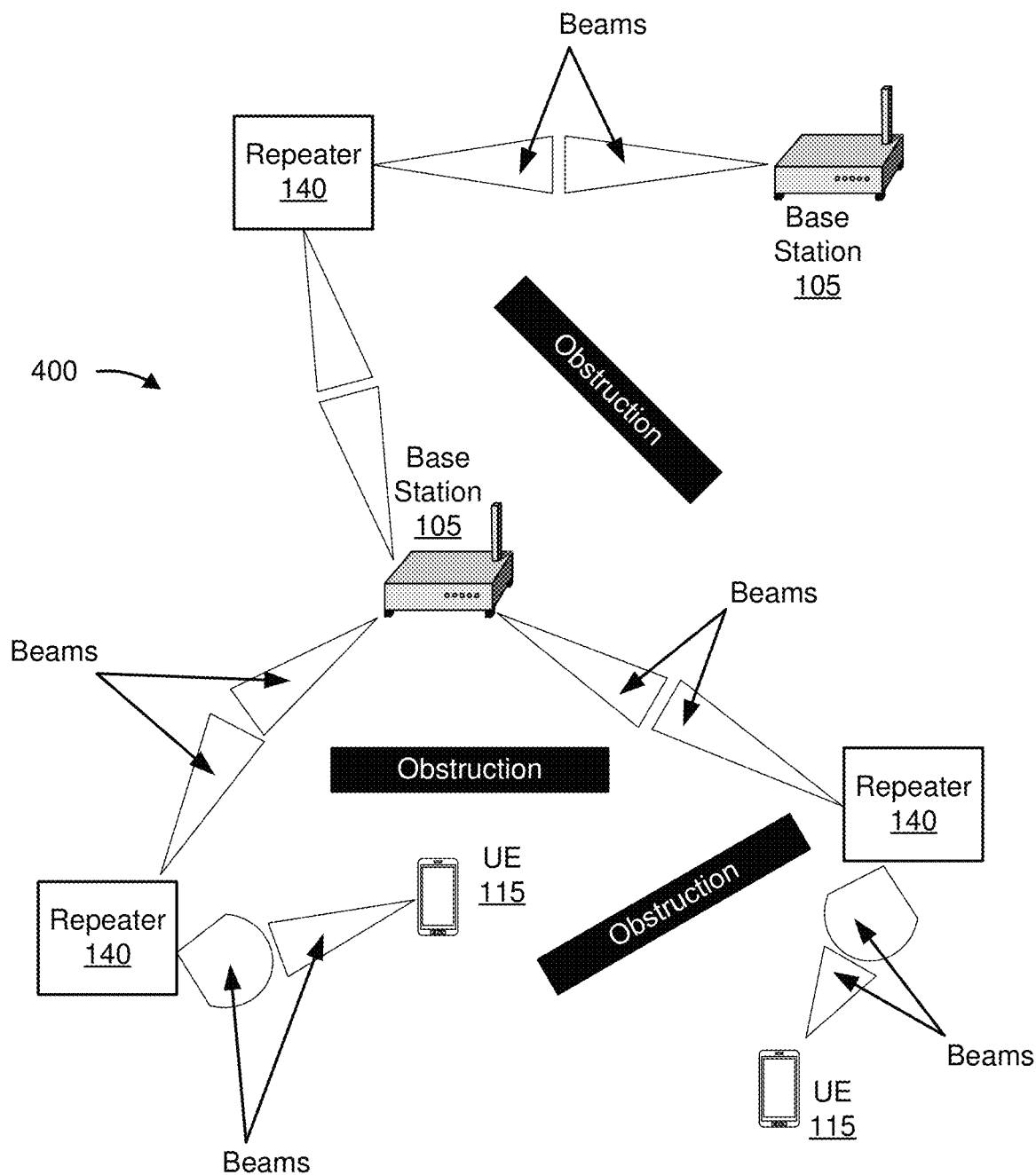
FIG. 4 illustrates an example of a communication system that uses one or more repeaters.

FIG. 4 illustrates an example of a communication system 400 that uses one or more repeaters in accordance with aspects of the present disclosure. FIG. 4 describes the repeaters in the context of mmWave transmissions, although the repeaters may be used for other communication types as well. Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 105 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 105, to extend coverage to UEs 115 without line of sight to the base station 105 (e.g., due to an obstruction), to extend coverage from one base station 105 to another base station 105 (e.g., due to an obstruction or due to other forms of path loss), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 105 via a first beam (e.g., a backhaul beam over a backhaul link with the base station 105) and to communicate with a UE 115 via a second beam (e.g., an access beam over an access link with the UE 115). Alternatively, the millimeter wave repeater 140 may communicate between two base stations 105 (e.g., in a wireless backhaul link) or between two UEs 115 (e.g., in a D2D or P2P link). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may use resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 105. As shown in FIG. 4, the millimeter wave repeater 140 may use a narrower beam to communicate with the base station 105 without unnecessarily consuming network resources and/or resources of the millimeter wave repeater 140 because the need for beam training, beam maintenance, and/or beam management may be limited, due to limited or no mobility of the base station 105 and the millimeter wave repeater 140 (and/or due to a line of sight communication path between the base station 105 and the millimeter wave repeater 140).

As further shown in FIG. 4, the millimeter wave repeater 140 may use a wider beam (e.g., a pseudo-omnidirectional beam and/or the like) to communicate with one or more UEs 115. This wider beam may provide wider coverage for access links, thereby providing coverage to mobile UEs 115 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities on the mmWave communication interface, resources of the base station 105 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 105 and the millimeter wave repeater 140. In this way, the millimeter wave repeater 140 may increase a coverage area, provide access around obstructions (as shown), and/or the like, while conserving resources of the base station 105, resources of the millimeter wave repeater 140, network resources, and/or the like.

Figure 5:
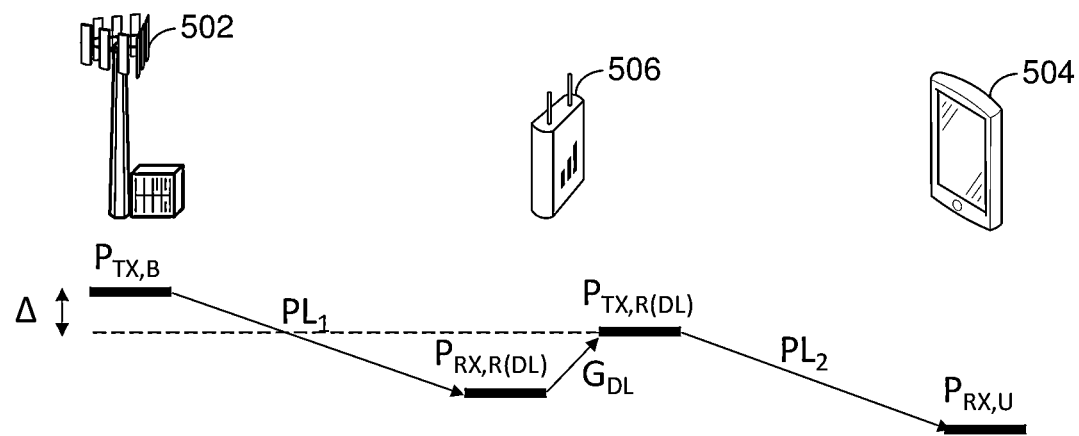
FIG. 5 illustrates an example of a downlink communication path through a repeater.

FIG. 5 illustrates an example of a downlink communication path from a base station 502 to a UE 504 through a repeater 506. In the downlink communication path example of FIG. 5, the base station 502 transmits at power level $P_{TX,B}$, which represents the transmission (TX) power (P) at the base station (B). The transmitted signal experiences an amount of path loss ($PL_1$) when transmitted from the base station 502 to the repeater 506. The path loss results in the transmitted signal being received at the repeater 506 at receive power $P_{RX,R(DL)}$, which represents receive (RX) power (P) at the repeater (R) for a downlink (DL) transmission. The repeater 506 applies a gain ($G_{DL}$) to the signal received from the base station 502. The gain applied to the received signal at the repeater 506 results in the repeater 506 transmitting the signal to the UE 504 at power level $P_{TX,R(DL)}$. The transmitted signal experiences an amount of path loss ($PL_2$) when transmitted from the repeater 506 to the UE 504. The path loss results in the transmitted signal being received at the UE 504 at receive power $P_{RX,U}$, which represents receive (RX) power (P) at the UE (U) for a downlink (DL) transmission. The path loss values ($PL_1$ and $PL_2$) represent any over-the-air losses experienced in the communication channel offset by any transmit array gains or receive array gains applied to the signal, such as beamforming gains.

The difference between the power level $P_{TX,B}$ used at the base station 502 and the power level $P_{TX,R(DL)}$ used at the repeater 506 is represented in FIG. 5 as a delta ($\Delta$). The delta value may be customized by the base station 502 to be zero (e.g., a same transmission power level at both devices), or to be another other value to meet the performance goals of the system. The base station 502 may customize, adjust, or dynamically set the delta by selecting the transmission power used by the base station 502, selecting the gain value applied at the repeater 506, selecting the transmission power used by the repeater 506 (which could be used by the repeater 506 to derive the gain value to apply to a received downlink signal), or any combination thereof. Although FIG. 5 illustrates a single repeater between the base station 502 and the UE 504, other implementations may include additional repeaters creating a multi-hop repeater network between the base station 502 and the UE 504.

The gain value ($G_{DL}$) at the repeater 506 may be adjusted by the base station 502 or the repeater itself. The available gain values may be subject to one or more constraints, such as a maximum gain or a maximum output power at the repeater 506. The maximum gain may be established as a function of loop gain, input power, or other factors. In some implementations, the base station 502 jointly sets (or adjusts) its own transmission power and the relays power gain (or transmission power). Having multiple power or gain adjustment points may allow the base station 502 to achieve a desired target receive power at the UE 504, achieve interference management goals, achieve power savings at the base station or the repeater, or any combination thereof.

As one example, the base station 502 may save power at the repeater 506 by setting the gain value at the repeater 506 to a relatively low value within a range of available gain values, thus resulting in a relatively low transmission power level at the repeater 506 which would use less power than if a higher repeater transmission power was used. As another example, the base station 502 may reduce interference in the signal received at the UE 504 by transmitting from the base station 502 at a relatively high value within a range of available transmit power levels, thus avoiding the need for a relatively high gain value at the repeater 506 which may otherwise boost any interference received with the signal incoming to the repeater 506. As yet another example, the base station 502 may achieve a target receive power of the signal at the UE 504 by setting the gain value at the repeater 506 to a relatively high value within a range of available gain values, thus resulting in a higher receive power at the UE 504 than if a lower gain value was applied at the repeater 506.

The decisions by the base station 502 regarding which power level to use at the base station 502 and which gain value to use at the repeater 506 may be made based on information (e.g., one or more power configuration parameters) received from the repeater 506, the UE 504, or both. These power configuration parameters received from other devices allow the base station 502 to determine the channel conditions for the downlink communication path and set transmission power or gain values to achieve the communication goals of the system based on the determined channel conditions, and the power control settings and/or limits of the devices in the communication path.

The power configuration parameters sent from the repeater 506 to the base station 502 may include any one or more of: a power headroom parameter associated with the repeater 506, a current transmit power parameter associated with the repeater 506, a current gain setting value associated with the repeater 506, a maximum gain setting value associated with the repeater 506, a maximum output power value associated with the repeater 506, or any other information that the base station 502 may seek from the repeater 506 for managing the power control process of the end-to-end system. The UE 504 may also send information (e.g., power configuration parameters) to the base station 502 to assist the base station 502 in determining the channel conditions. For example, the UE 504 may send a received power report to the base station 502 indicating a power level of a received communication. The base station 502 may use information from the repeater 506, information from the UE 504, information determined by the base station itself, or any combination thereof to determine desired transmission power levels and/or gain values for the repeater 506 or the base station 502.

Figure 6:
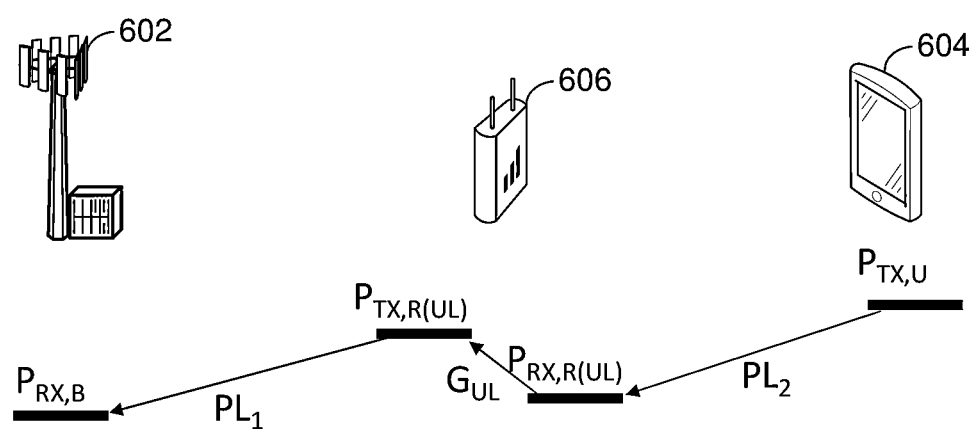
FIG. 6 illustrates an example of an uplink communication path through a repeater.

FIG. 6 illustrates an example of an uplink communication path from a UE 604 to a base station 602 through a repeater 606. In the uplink communication path example of FIG. 6, the UE 604 transmits at power level $P_{TX,U}$, which represents the transmission (TX) power (P) at the UE (U). The transmitted signal experiences an amount of path loss ($PL_2$) when transmitted from the UE 604 to the repeater 606. The path loss results in the transmitted signal being received at the repeater 606 at receive power $P_{RX,R(UL)}$, which represents receive (RX) power (P) at the repeater (R) for an uplink (UL) transmission. The repeater 606 applies a gain ($G_{UL}$) to the signal received from the UE 604. The gain applied to the received signal at the repeater 606 results in the repeater 606 transmitting the signal to the base station 602 at power level $P_{TX,R(UL)}$. The transmitted signal experiences an amount of path loss ($PL_1$) when transmitted from the repeater 606 to the base station 602. The path loss results in the transmitted signal being received at the base station 602 at receive power $P_{RX,B}$, which represents receive (RX) power (P) at the base station (B). The path loss values ($PL_1$ and $PL_2$) represent any over-the-air losses experienced in the communication channel offset by any transmit array gains or receive array gains applied to the signal, such as beamforming gains.

The base station 602 may control the transmission power levels at the UE 604, the repeater 606, or both. For example, the base station 602 may control the difference between the power level $P_{TX,U}$ used at the UE 604 and the power level $P_{TX,R(UL)}$ used at the repeater 606. The delta value between these two transmission levels may be customized by the base station 602 to be zero (e.g., a same transmission power level at both devices), or to be another other value to meet the performance goals of the system. The base station 602 may customize, adjust, or dynamically set the delta by selecting the transmission power used by the UE 604, selecting the gain value applied at the repeater 606, selecting the transmission power used by the repeater 606 (which could be used by the repeater 606 to derive the gain value to apply to a received uplink signal), or any combination thereof. Although FIG. 6 illustrates a single repeater between the base station 602 and the UE 604, other implementations may include additional repeaters creating a multi-hop repeater network between the base station 602 and the UE 604.

The gain value ($G_{UL}$) at the repeater 606 may be adjusted by the base station 602 or the repeater itself. The available gain values may be subject to one or more constraints, such as a maximum gain or a maximum output power at the repeater 606. The maximum gain may be established as a function of loop gain, input power, or other factors. In some implementations, the base station 602 jointly sets (or adjusts) the transmission power of the UE and the power gain (or transmission power) of the repeater. Having multiple power or gain adjustment points may allow the base station 602 to achieve a desired target receive power at the base station 602, achieve interference management goals, achieve power savings at the UE or the repeater, or any combination thereof.

As one example, the base station 602 may save power at the repeater 606 by setting the gain value at the repeater 606 to a relatively low value within a range of available gain values, thus resulting in a relatively low transmission power level at the repeater 606 which would use less power than if a higher repeater transmission power was used. As another example, the base station 602 may save power at the UE 604 by setting the transmission power level at the UE 604 to a relatively low value within a range of available gain values, which would use less power than if a higher UE transmission power was used. As yet another example, the base station 602 may reduce interference in the signal received at the base station 602 by instructing the UE 604 to transmit at a relatively high value within a range of available transmit power levels, thus avoiding the need for a relatively high gain value at the repeater 606 which may otherwise boost any interference received with the signal incoming to the repeater 606. As still another example, the base station 602 may achieve a target receive power of the signal at the base station 602 by setting the gain value at the repeater 606 to a relatively high value within a range of available gain values, thus resulting in a higher receive power at the base station 602 than if a lower gain value was applied at the repeater 606.

The decisions by the base station 602 regarding which power level to use at the UE 604 and which gain value to use at the repeater 606 may be made based on information (e.g., one or more power configuration parameters) received from the repeater 606, the UE 604, or both. These power configuration parameters received from other devices allow the base station 602 to determine the channel conditions for the uplink communication path and set transmission power or gain values to achieve the communication goals of the system based on the determined channel conditions, and the power control settings and/or limits of the devices in the communication path. The base station may use some or all of the power configuration parameters for the uplink power control process, as described above in connection with the downlink communication path of FIG. 5. The base station 602 may also receive additional information specific to the uplink communication path that would assist in setting power control settings for uplink communications, such as a transmission power used by the UE 604 (or the base station 602 may determine this information based on information already available to the base station).

Figure 7:
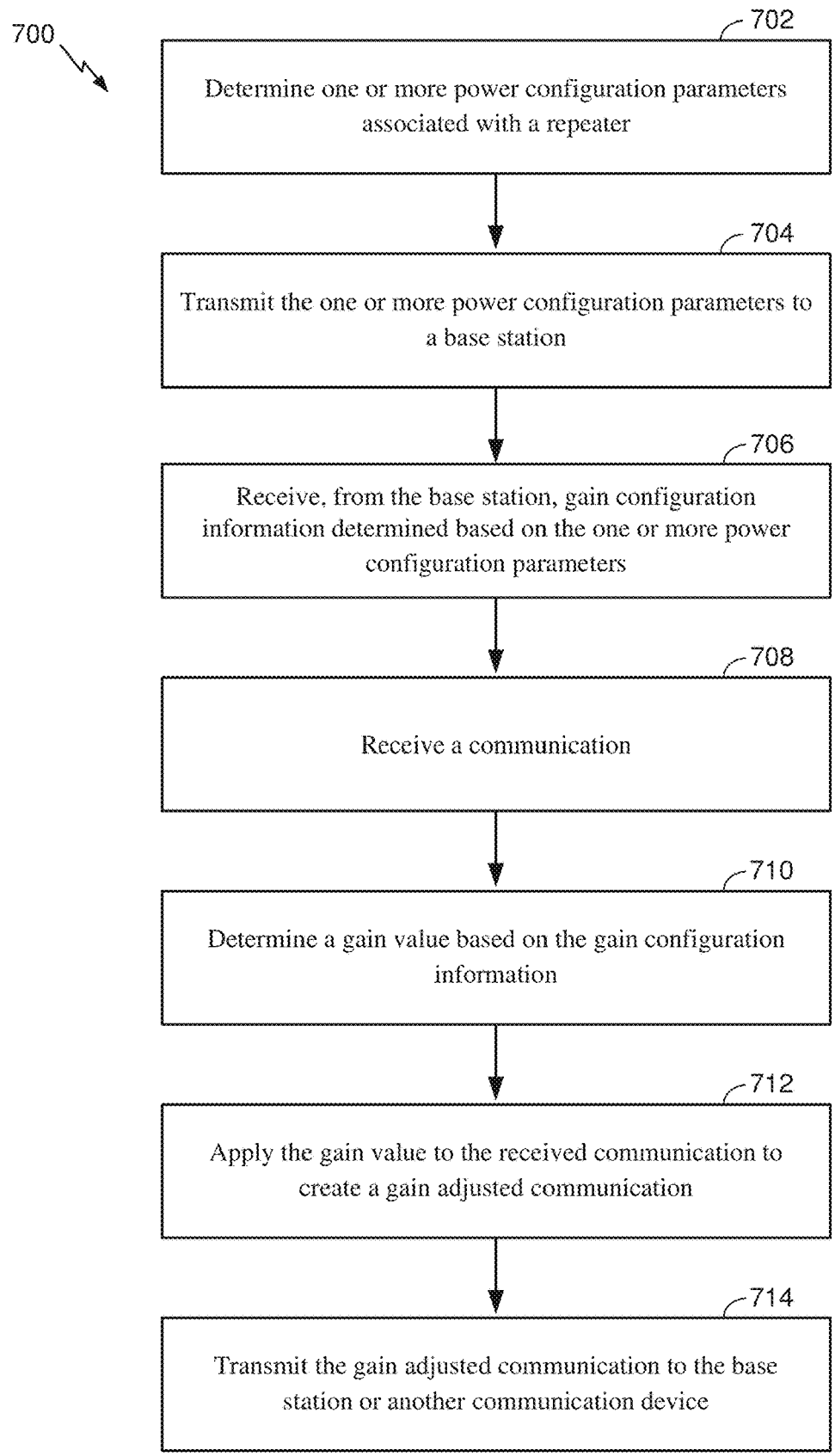
FIG. 7 is a flow diagram illustrating one example of a technique for a repeater to create a gain adjusted communication.

FIG. 7 is a flow diagram illustrating one example of a process 700 for a repeater to create a gain adjusted communication as part of a wireless communication system where the repeater amplifies and relays communications between a first communication device (e.g., a UE, a base station, or another repeater) and a second communication device (e.g., a UE, a base station, or another repeater). The operations of process 700 may be implemented by a repeater, such as repeater 140 (FIGS. 1 and 4), repeater 205 (FIG. 2), repeater 506 (FIG. 5), repeater 606 (FIG. 6) or one or more sub-components of the repeater. For example, with reference to FIGS. 2 and 7, the operations of process 700 may be performed by one or more transceivers 230 (e.g., the transmission and/or receiving actions of process 700), one or more processors 210, and/or instructions stored in memory 215 that are executed by a processor 210 to enable the repeater to perform the recited actions (e.g., the processing actions of process 700).

At block 702, the repeater determines one or more power configuration parameters associated with the repeater. Some power configuration parameters may be static pre-configured values, such as maximum gain or maximum transmission power level. Other power configuration parameters may be dynamic and may change based on the current operating conditions, such as the currently used gain or currently used transmission power level.

The power configuration parameters may include any one or more of: a power headroom parameter associated with the repeater, a current transmit power parameter associated with the repeater, a current gain setting value associated with the repeater, a maximum gain setting value associated with the repeater, a maximum output power value associated with the repeater, or any other information that a controlling node (e.g., base station or other entity) may seek from the repeater for use in managing the power control process of the end-to-end communication system. The power headroom parameter may indicate a difference between a maximum output power level and a currently used output power level. The current transmit power parameter may indicate the power level used for a last transmission from the repeater or a power level that would be used for an upcoming transmission from the repeater if the power level is not adjusted (e.g., adjusted by the controlling node, such as a base station, control signaling). The current gain setting value may represent the gain value used for a last amplification done at the repeater or a gain value that would be used for amplifying an upcoming transmission received at the repeater if the gain value is not adjusted (e.g., adjusted by the controlling node, such as a base station, control signaling). The maximum gain setting value may indicate the highest gain value that the repeater is able to apply to amplify an incoming signal. The maximum output power value may indicate the highest transmission power level that the repeater is able to use for an outgoing signal.

The power configuration parameters determined by the repeater may be interface-specific, beam-specific, or both. An interface-specific power configuration parameter may be determined by the repeater for a specific interface, such as an access interface between a UE and the repeater, a backhaul interface between a base station and the repeater, or a repeater interface between two repeaters. One power configuration parameter may be different depending on which interface is associated with the parameter. For example, the current gain value of the repeater may be different for uplink traffic (on a backhaul interface with the base station) than it would be for downlink traffic (on an access interface with the UE). To account for differing power configuration parameters based on the associated interface, the repeater may determine a first set of power configuration parameters specific to a first interface with the base station, and determine a second set of power configuration parameters specific to a second interface with the communication device (e.g., UE). The second set of power configuration parameters may be different than the first set of power configuration parameters by having different values for specific parameters based on the difference in interface.

A beam-specific power configuration parameter may be determined by the repeater for a specific communication beam. One power configuration parameter may be different depending on which communication beam is associated with the parameter. For example, the current gain value of the repeater may be different for a first beam than it is for a second beam that is different than the first beam. To account for differing power configuration parameters based on the associated beam, the repeater may determine a first set of power configuration parameters specific to a first beam and determine a second set of power configuration parameters specific to a second beam. The second set of power configuration parameters may be different than the first set of power configuration parameters by having different values for specific parameters based on the difference in associated beam.

At block 704, the repeater transmits the one or more power configuration parameters from the repeater to a controlling node, such as a base station or other entity. In some systems, the controlling node may be the same base station that exchanges data traffic with the repeater. In other systems, the controlling node may be a different entity, such as a UE, a second repeater, a second base station different from the base station that sends downlink traffic to be amplified at the repeater, a cloud-based management entity, another network entity or function, or another type of controlling node. The repeater may transmit a single set of one or more configuration parameters to the controlling node (e.g., base station) or may transmit multiple different sets of one or more configuration parameters to the controlling node (e.g., base station). For example, the multiple different sets of parameters may enable the repeater to distinguish between parameters relevant to different communication interfaces (access vs. backhaul) or distinguish between parameters relevant to different communication beams (beam 1 vs. beam 2). Where the repeater has multiple different sets of parameters, the repeater may transmit a first set of power configuration parameters and a second set of power configuration parameters to the controlling node (e.g., base station). The repeater may also transmit additional information to the base station. For example, the repeater may measure a power level of a signal received at the repeater and report the received power level measurement to the base station. This received power level reporting may be included in a common message with the power configuration parameter reporting (e.g., where the received power measurement is part of the power configuration parameters). Alternatively, the received power level reports may be transmitted separately from the reports that convey the one or more power configuration parameters.

The power configuration parameter reporting at block 704 may be done periodically, aperiodically, or based on an event trigger. In implementations using the periodic reporting, the repeater may be configured with a periodic reporting schedule based on a pre-defined configuration or based on a negotiation with the controlling node (e.g., base station). In implementations using an aperiodic or event-based trigger, the repeater may transmit the power configuration parameter report based on detecting an event trigger and transmitting the report to the controlling node (e.g., base station) in response to the event trigger.

The event trigger may be based on one or more of detecting a request from the base station for updated power configuration parameters, detecting satisfaction of an output power threshold condition, detecting satisfaction of a gain setting threshold condition, detecting satisfaction of a received power threshold, or any other configured reporting trigger condition. When the event trigger is based on a request from the base station, the repeater may receive a request to the repeater for updated power configuration parameters, and the repeater may transmit the one or more power configuration parameters in response to the request. When the event trigger is based on a threshold trigger, the repeater may be configured with a threshold (e.g., a gain threshold or a power threshold) based on a pre-defined configuration or based on a negotiation with the base station. For example, the base station may configure the repeater with an output power threshold or a gain setting threshold. When the repeater detects that a current output power level satisfies the output power threshold or a current gain level satisfies the gain setting threshold, then the repeater may report the one or more power configuration parameters to the base station in response to satisfaction of the output power threshold or the gain setting threshold. The event trigger may be based on alternative metrics in other implementations. For example, the event trigger bay be based on a comparison between a received power level and a receive power threshold where the UE triggers a parameter report when the received power level satisfies the threshold.

At block 706, the repeater receives gain configuration information from the controlling node (e.g., base station or other entity). The gain configuration information provides information regarding one or more gain settings or power level settings determined by the base station based at least in part on the one or more power configuration parameters provided to the base station from the repeater. The gain of the repeater may be adjustable by the base station, subject to one or more constraints, such as a maximum gain of the repeater or a maximum output power of the repeater. The maximum gain of the repeater may be a function of loop gain and optionally also input power (to control self-interference or clutter echo). In some conditions, the gain configuration information may include an instruction for the repeater to apply a maximum available gain to a received communication. In other conditions, the gain configuration information may include an instruction for the repeater to apply a minimum available gain to a received communication. In still other conditions, the gain configuration information may include an instruction for the repeater to apply a gain level at a dynamically selected point somewhere between the minimum available gain and the maximum available gain.

The gain configuration information may explicitly provide a gain value to apply at the repeater, may explicitly provide an output power level to use at the repeater, or may provide information usable by the repeater to derive a gain value and/or an output power level. The gain configuration information may provide instructions for setting a single gain setting value or single output power level, or may provide instructions for setting multiple different gain setting values or multiple different output power levels. As one example, the gain configuration information may indicate a first gain setting value or output power level for a first transmission direction or a first communication interface, and a second gain setting value or output power level (different from the first gain setting value or output power level) for a second transmission direction or a second communication interface. In one specific example, the gain configuration information may provide the repeater with a different gain to apply to uplink communications than the gain used to apply to downlink communications.

At block 708, the repeater receives a communication. The received communication is a transmission, message, or other information that is intended to be received by the repeater and forwarded to another device. Some repeaters within a wireless communication system may be designed to be layer 1 millimeter wave repeaters (L1 mmW repeaters). These repeaters may include a low frequency interface (e.g., LTE, sub-6 GHz NR, Wi-Fi, Bluetooth, or other communication protocol) and a high frequency interface (e.g., a mmWave interface). A L1 mmW repeater may be able to receive and forward a mmWave signal (with some internal signal processing, such as applying a gain to the received signal before forwarding the amplified signal), but may not be able to further interpret the content of a signal received on its mmW interface or generate new content for a mmW signal to be transmitted on the mmW interface. As one example, in some implementations, a L1 mmW repeater may lack at least some of the physical layer, medium access control, and radio resource control (PHY/MAC/RLC) (or higher layers) protocol stack on the mmW interface that would be present in layer 2 or layer 3 repeaters to interpret the content of a received mmW signal or generate new content for a mmW signal. For example, an L1 mmW repeater may lack a MAC scheduler on the mmW interface, in some implementations. Other repeaters within a wireless communication system may be higher functioning repeaters (e.g., layer 2 repeaters or layer 3 repeaters) that have additional processing functionality to interpret the content of a signal received on its mmW interface or generate new content for a mmW signal to be transmitted on the mmW interface. The communication received at block 708 may be an analog millimeter wave signal that is received by the repeater via one or more receive antennas and based on receive beamforming.

At block 710, the repeater determines a gain value to apply to an incoming communication based on the gain configuration information received from the controlling node (e.g., base station or other entity). The repeater may determine the gain value to apply based solely by the gain configuration information received from the base station, or may determine the gain value to apply based on the gain configuration information received from the base station and also based on one or more gain control factors determined locally at the repeater. As one example, the gain configuration information received at the repeater from the base station explicitly specifies the gain value to be used by the repeater. As another example, the gain configuration information received at the repeater from the base station provides information that the repeater may use to determine the gain value to be used by the repeater.

In some implementations, the repeater applies the same gain value to both uplink and downlink communications (e.g., the repeater gain is symmetric for communications in both directions). In some implementations, the gain value is more dynamic, and the repeater may apply different amounts of gain to uplink and downlink communications depending on the direction (up vs. down) of the communication (e.g., the repeater gain is asymmetric for communications in the two directions). For example, in these implementations, to determine the gain value to apply to a given incoming communication, the repeater may determining whether the received communication is an uplink communication or a downlink communication, and then select the gain value to apply based on the gain configuration information received from the base station and the determination by the repeater of whether the received communication is an uplink communication or a downlink communication.

At block 712, the repeater applies the determined gain value to the received communication to create a gain adjusted communication. To achieve the gain, the repeater may include a power amplifier and a variable gain amplifier that is set based on the gain configuration information received from the controlling node (e.g., base station or other entity). The variable gain amplifier may provide a variable range of gain value possibilities depending on the gain value determined at block 710. As discussed above, the repeater may be configured to receive an analog millimeter wave signal. The repeater may then apply the gain value by amplifying the received analog millimeter wave signal (in some implementations without performing analog-to-digital conversion of the analog millimeter wave signal) to be transmitted via one or more transmit antennas and based on transmit beamforming. At block 714, the repeater transmits the gain adjusted communication to another device, such as the base station, a UE, or another communication device.

In the process 700, the repeater may send and receive various communications, including receiving a communication (block 708), transmitting a forwarded communication (block 714), transmitting control information (e.g., the power configuration parameters sent to the controlling node, such as the base station (block 704), and receiving control information (e.g., the gain configuration information (block 706)). These communications may all be on a single radio access technology (RAT) or may be split between multiple RATs. In some implementations, the repeater may use a side link or out-of-band (OOB) communication path for control information. In this option, the repeater uses a first RAT to transmit the one or more power configuration parameters (block 704) and receive the gain configuration information (block 706), and the repeater uses a second RAT, different than the first RAT, to receive the communication (block 708) and transmit the gain adjusted communication (block 714). The first RAT may be a non-mmWave interface, such as an interface associated with LTE, sub-6 GHz NR, Wi-Fi, Bluetooth, etc., and the second RAT may be a mmWave NR interface. In other implementations, the repeater may use a first frequency range within a single RAT to transmit the one or more power configuration parameters (block 704) and receive the gain configuration information (block 706), and the repeater uses a second frequency range, different than the first frequency range, within the single RAT to receive the communication (block 708) and transmit the gain adjusted communication (block 714). In still other implementations, the repeater may use different bandwidth parts (BWPs) for different types of communications. In this option, the repeater uses a first BWP within a single frequency range of a single RAT to transmit the one or more power configuration parameters (block 704) and receive the gain configuration information (block 706), and the repeater uses a second BWP, different than the first BWP, within the single frequency range of the single RAT to receive the communication (block 708) and transmit the gain adjusted communication (block 714).

Figure 8:
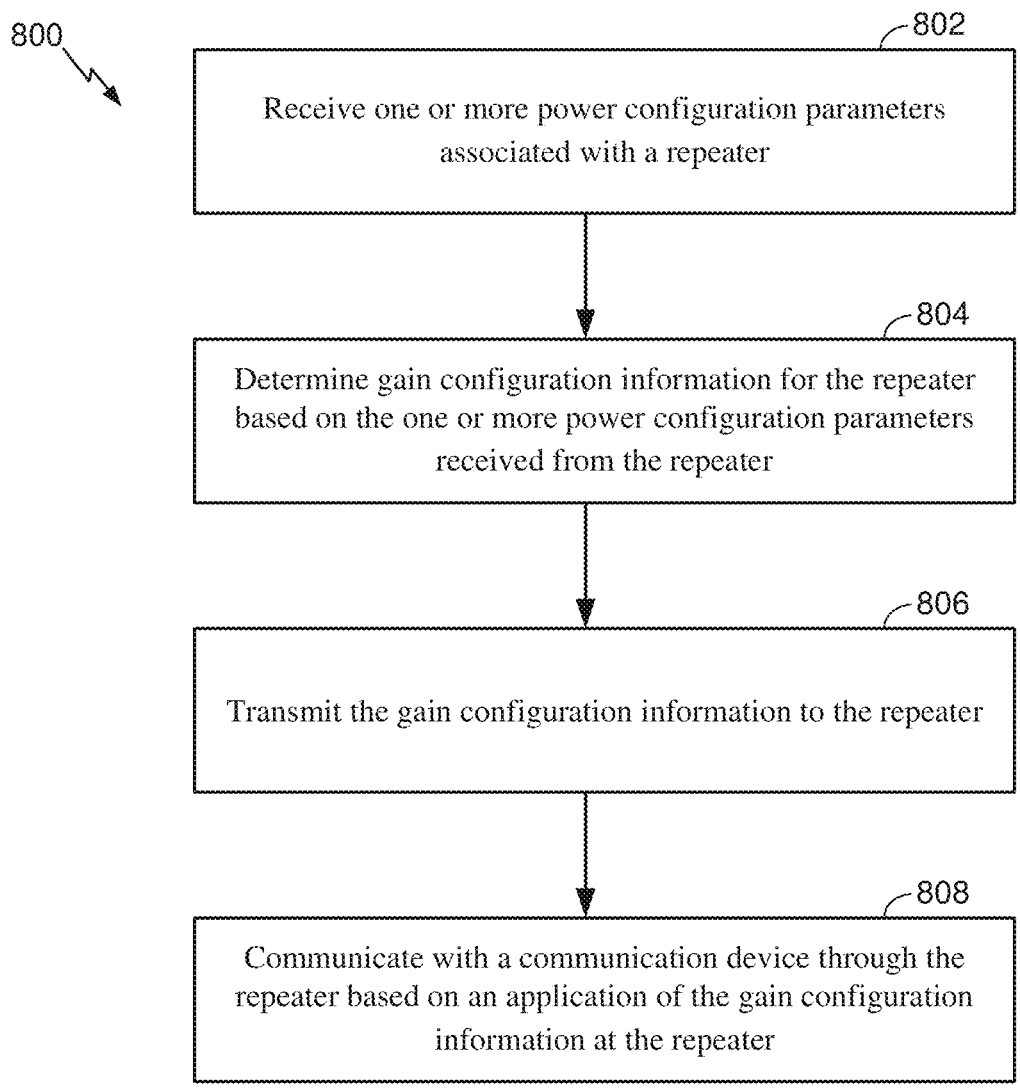
FIG. 8 is a flow diagram illustrating one example of a technique for a base station to communicate with another device through a repeater.

FIG. 8 is a flow diagram illustrating one example of a process 800 for a controlling node, such as a base station, to communicate with a repeater. In some systems, the operations of process 800 may be implemented by a base station, such as base station 105 (FIGS. 1 and 4), base station 305 (FIG. 3), base station 502 (FIG. 5), base station 602 (FIG. 6) or one or more sub-components of the base station. For example, with reference to FIGS. 3 and 8, the operations of process 800 may be performed by one or more transceivers 330 (e.g., the transmission and/or receiving actions of process 800), one or more processors 210, and/or instructions stored in memory 215 that are executed by a processor 210 to enable the repeater to perform the recited actions (e.g., the processing actions of process 800). Although FIG. 8 will be discussed below in connection with a system where a base station is the controlling node for the repeater, other types of controlling nodes (e.g., a UE, a second repeater, a second base station different from the base station that sends downlink traffic to be amplified at the repeater, a cloud-based management entity, another network entity or function, etc.) may execute the operations of process 800 in alternative systems.

At block 802, the base station receives one or more power configuration parameters associated with the repeater. Additional details regarding the contents and use of the power configuration parameters received by the base station are described in more detail in connection with blocks 702 and 704 of FIG. 7 where the repeater determines the power configuration parameters and transmits the power configuration parameters to the base station. At block 804, the base station determines gain configuration information for the repeater based on the one or more power configuration parameters received from the repeater. At block 806, the base station transmits the gain configuration information from the base station to the repeater. Additional details regarding the contents and use of the gain configuration information transmitted by the base station to the repeater are described in more detail in connection with blocks 706 and 710 of FIG. 7 where the repeater receives the gain configuration information and determines a gain value based on the gain configuration information received from the base station. At block 808, the base station communicates with the communication device through the repeater based on an application of the gain configuration information at the repeater. For example, the communication with the other device through the repeater may include receiving a communication from the communication device via the repeater that has been gain adjusted at the repeater based on the gain configuration information, or transmitting a communication to the repeater to be gain adjusted at the repeater based on the gain configuration information before being relayed from the repeater to the communication device. Further details of these uplink and downlink communications through a gain amplifying repeater are described in more detail at blocks 708, 710, 712, and 714 of FIG. 7. The actions in block 808 may not be performed by the controlling node in some implementations. In some systems, the controlling node that configures one or more gain values at the repeater may be the same base station that exchanges data traffic with the repeater. In this example, the base station may perform block 808. In other systems, the controlling node may be a different entity than the base station that exchanges data traffic with the repeater, and thus the controlling node may not perform the operations of block 808.

Figure 9:
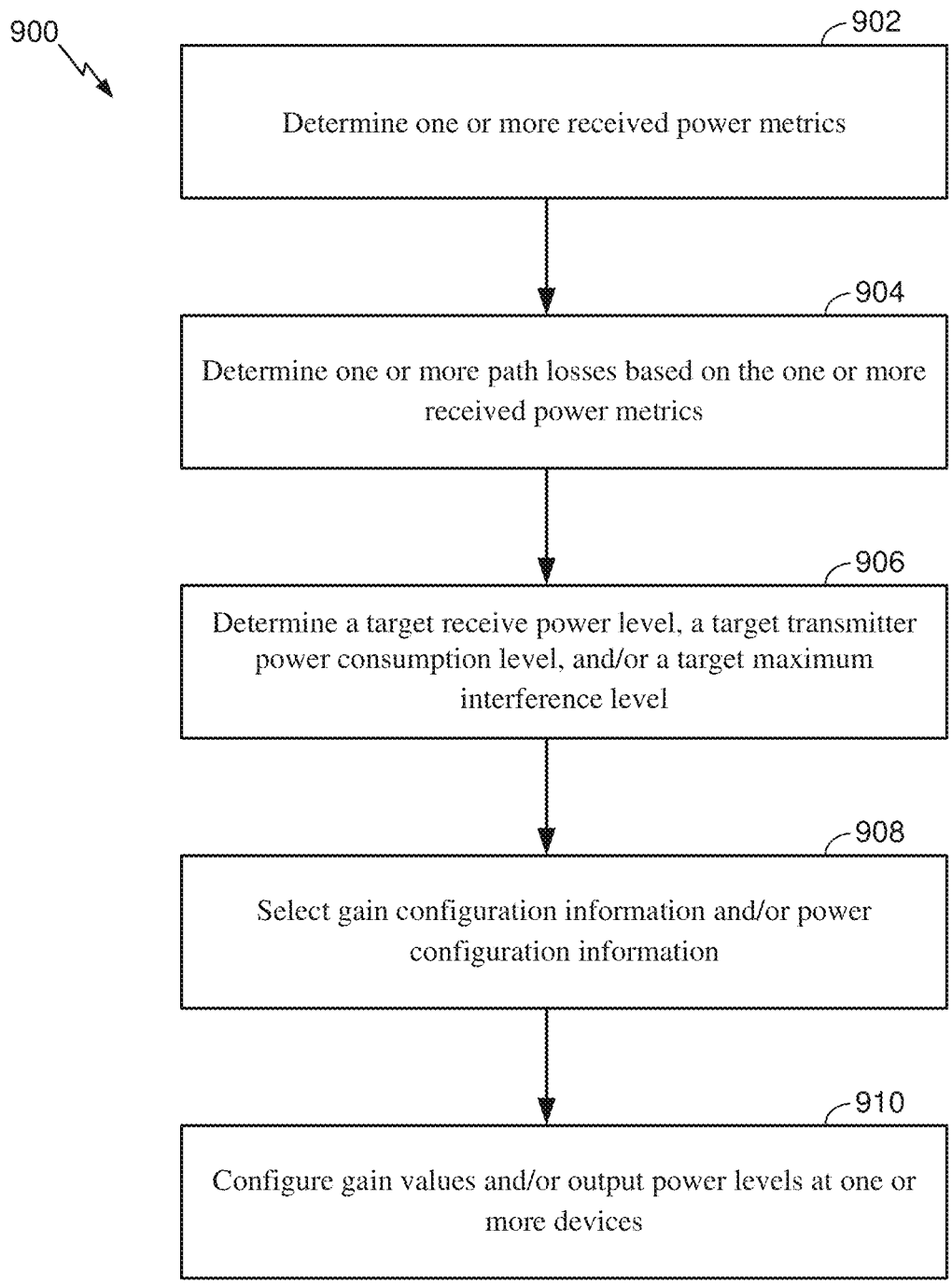
FIG. 9 is a flow diagram illustrating one example of a technique for a base station to configure one or more gain values and/or output power levels at one or more devices.

FIG. 9 is a flow diagram illustrating one example of a process 900 for a controlling node, such as a base station, to configure one or more gain values and/or output power levels at one or more devices (e.g., at a UE, at a repeater, and/or at the base station itself). In some systems, the operations of process 900 may be implemented by a base station, such as base station 105 (FIGS. 1 and 4), base station 305 (FIG. 3), base station 502 (FIG. 5), base station 602 (FIG. 6) or one or more sub-components of the base station. For example, with reference to FIGS. 3 and 8, the operations of process 800 may be performed by one or more transceivers 330 (e.g., the transmission and/or receiving actions of process 900), one or more processors 210, and/or instructions stored in memory 215 that are executed by a processor 210 to enable the repeater to perform the recited actions (e.g., the processing actions of process 900). Although FIG. 9 will be discussed below in connection with a system where a base station is the controlling node for the repeater (and other devices), other types of controlling nodes (e.g., a UE, a second repeater, a second base station different from the base station that sends downlink traffic to be amplified at the repeater, a cloud-based management entity, another network entity or function, etc.) may execute the operations of process 900 in alternative systems.

At block 902, the base station determines one or more received power metrics. For uplink communications, the base station may determine received power metrics itself based on measurement of one or more uplink communications. The base station may also receive one or more received power reports from a repeater regarding a received power measurement for an uplink communication transmitted from a device (e.g., UE or another repeater) to the repeater that reports the received power metric. For downlink communications, the base station may determine the received power metrics from one or more received power reports from other devices. For example, a repeater and/or UE may receive a communication from the base station, measure the received power level, and then report one or more received power measurements back to the base station. For a given communication or set of communications, the base station may receive one or more received power reports from the repeater and one or more received power reports from the UE.

At block 904, the base station determines one or more path losses based on the received power metrics determined at block 902. In an example communication path that involves one base station, one repeater, and one UE, the base station may determine one or more of a total end-to-end path loss between the base station and the UE, a path loss between the repeater and the base station, or a path loss between the repeater and the UE. In other example communication paths with other configurations of one or more base stations, one or more repeaters, and one or more UEs, the base station may perform additional path loss calculations.

The base station may determine the path loss experienced for an end-to-end downlink communication by comparing the known transmission power level of the base station to the received power level reported by a UE that received the downlink communication. Similarly, the base station may determine the path loss experienced for an end-to-end uplink communication by comparing the known transmission power level of the UE to the measured received power level determined at the base station. The base station may also be able to break up an end-to-end path loss into multiple constituent parts based on received power reports received from a repeater (for either uplink or downlink communications) in the path between the base station and UE.

In some implementations, the path loss calculations may be based on transmission of one or more Synchronization Signal/PBCH (physical broadcast channel) Block (SSB)

messages or one or more Channel State Information Reference Signal (CSI-RS) messages. For example, a downlink pathloss estimation may be done at a UE. The transmission power of SSBs is known and is indicated in a system information block (e.g., SIB1) parameter "ss-PBCH-Block-Power." This parameter indicates the transmission power level used by the base station for the SSB. The UE may then calculate the path loss based on a difference between the measured received power of an SSB at the UE against the known transmission power from the base station. If using CSI-RS messages for channel estimation, the base station may indicate the power level of the CSI-RS messages, such as via an offset (−3 dB, 0, 3 dB, or 6 dB) to the SSB transmission power. The UE may then calculate the path loss based on a difference between the measured received power of a CSI-RS at the UE against the known transmission power from the base station. If the UE is determining path loss information and/or received power information, the UE may report the measurements or determinations back to the base station to allow the base station to use the measurements or determinations for controlling transmission power or gain in the system.

At block 906, the base station determines one or more of a target receive power level associated with an upcoming communication, a target transmitter power consumption level associated with an upcoming communication, and/or a target maximum interference level associated with an upcoming communication. For an uplink communication, the base station may determine one or more of the target received power level at the base station for the uplink communication, a target power consumption level associated with transmissions from the UE or the repeater, and/or a target maximum interference level at the base station or other devices. For a downlink communication, the base station may determine one or more of the target received power level at the UE for the downlink communication, a target power consumption level associated with transmissions from the base station or the repeater, and/or a target maximum interference level at the UE or other devices. For either a downlink communication or an uplink communication, the base station may determine a target received power level at the repeater.

At block 908, the base station selects gain configuration information and/or power configuration information based at least in part on the one or more path loss determinations from block 904, the one or more target level determinations from block 906, or both. The base station may select gain configuration information for a repeater in the communication path by selecting a gain value for use as amplification at the repeater. The selection of the gain value may be based at least in part on the path loss determination of block 904 or the target level determinations of block 906. Additionally, or alternatively, the selection of the gain value at the base station for the repeater may be based at least in part on the one or more power configuration parameters associated with the repeater sent from the repeater to the base station at block 704 of FIG. 7. The base station may also select power configuration information at block 908, such as selecting output power levels used by the base station (for downlink), repeater (for uplink or downlink), or UE (for uplink).

At block 910, the base station configures gain values and/or output levels at one or more devices based on the determinations made at block 908. The base station may adjust one value, or multiple different values to achieve the desired performance goals.

As one example, the base station may coordinate selection of a transmission power level for use at the base station together with a gain value to be applied at the repeater based on a desired receive power level at the UE (or other target level determinations from block 906) for a downlink signal transmitted from the base station through the repeater to the UE. In some implementations, the transmission power level for use at the base station and the gain value to be applied at the repeater are both variable values selected by the base station. In other implementations, the transmission power level for use at the base station is a fixed value, and the gain value to be applied at the repeater is a variable value selected by the base station. The fixed value in some implementations may be set to a maximum available transmission power level. The maximum available transmission power level may be defined by hardware capabilities of the base station or limited by governmental regulations. Use of the maximum supported transmission power level at the base station may result in a higher end to end signal-to-noise ratio (SNR) level as compared to use of lower transmission power levels. In other implementations, the fixed value for the base station transmission may be set to a minimum available transmission power level. The minimum available transmission power level may be defined as the minimum power level that could still achieve a target receive power at another device, such as an amplifying repeater. Use of the minimum supported transmission power level at the base station may result in a lower power consumption at the base station for the transmission as compared to use of higher transmission power levels, or may result in a lower interference as compared to use of higher transmission power levels.

As another example, the base station may coordinate selection of a transmission power level for use at a UE together with a gain value to be applied at the repeater based on a desired receive power level at the base station (or other target level determinations from block 906) for an uplink signal transmitted from the UE through the repeater to the base station. In some implementations, the transmission power level for use at the UE and the gain value to be applied at the repeater are both variable values selected by the base station. In other implementations, the transmission power level for use at the UE is a fixed value, and the gain value to be applied at the repeater is a variable value selected by the base station. In some implementations, the fixed value for the UE transmission may be set to a maximum available transmission power level. The maximum available transmission power level may be defined by hardware capabilities of the UE or limited by governmental regulations. Use of the maximum supported transmission power level at the UE may result in a higher end to end signal-to-noise ratio (SNR) level as compared to use of lower transmission power levels. In other implementations, the fixed value for the UE transmission may be set to a minimum available transmission power level. The minimum available transmission power level may be defined as the minimum power level that could still achieve a target receive power at another device, such as an amplifying repeater. Use of the minimum supported transmission power level at the UE may result in a lower power consumption at the UE for the transmission as compared to use of higher transmission power levels, or may result in a lower interference as compared to use of higher transmission power levels.

In some implementations, the base station may configure gain values and/or output power levels at block 910 at multiple possible adjustment points. These multiple possible adjustment points allow the base station to customize a coordinated approach to power control. This coordinated approach may balance potentially competing goals throughout the system, such as saving power (e.g., at battery-powered devices), managing interference, or meeting a desired link budget. Regarding managing interference, the end-to-end (E2E) signal-to-noise ratio (SNR) for a downlink (DL) signal from a base station through a repeater to a UE may be approximately determined by the following equation (where SNR1 is the SNR between the base station and the repeater, SNR2 is the SNR between the repeater and the UE, and F is a factor related to an internal noise figure at the repeater):

$$SNR_{E2E}(DL) \approx \frac{1}{\frac{F}{SNR1} + \frac{1}{SNR2}}$$

Due to the noise boosting factor F of the amplify-forward style repeater in the communication path, SNR1 is more important than SNR2 to the overall E2E SNR. Thus, in some implementations, it may be desirable to have a high SNR value for SNR1. Accordingly, the base station may set its transmission power to a relatively high power enabling SNR1 to be relatively high. The base station may then set the gain value or output power level of the repeater accordingly to achieve the desired receive power level at the UE or a desired overall link budget. Similarly, for uplink signals, the repeater may amplify and forward any received interference causing a noise boosting situation. Thus, the base station may seek to set the transmission power of the UE relatively high to have a relatively good SNR on the first link of the communication path (e.g., the link from the UE to the repeater). The base station may then set the gain value or output power level of the repeater accordingly to achieve the desired receive power level at the UE or a desired overall link budget. Alternatively, the base station may desire to save power at the UE by setting a relatively low output power level, and then rely on the repeater to have a relatively higher gain value to make up for the low UE transmission power while still achieving the target receive power at the base station. Thus, with multiple adjustment points in the communication path, the base station can coordinate the gain values and output transmission levels to achieve a desired mix of power saving, interference reduction, and other performance goals.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A repeater that relays communications between a first communication device and a second communication device, comprising:
a processor; and
a memory coupled with the processor, wherein the memory includes instructions executable by the processor to cause the repeater to:
determine one or more power configuration parameters associated with the repeater;
transmit the one or more power configuration parameters from the repeater to a controlling node, wherein the one or more power configuration parameters transmitted from the repeater to the controlling node comprise a power headroom parameter associated with the repeater, a current transmit power parameter associated with the repeater, or a current gain setting value associated with the repeater;
receive, at the repeater from the controlling node, gain configuration information determined for the repeater based on the power headroom parameter associated with the repeater, the current transmit power parameter associated with the repeater, or the current gain setting value associated with the repeater;
receive a communication from the first communication device;
determine a gain value for the repeater based on the gain configuration information;
apply the gain value at the repeater to the received communication to create a gain adjusted communication; and
transmit the gain adjusted communication from the repeater to the second communication device.

2. The repeater of claim 1, wherein the one or more power configuration parameters transmitted from the repeater to the controlling node comprise the power headroom parameter associated with the repeater, wherein the gain configuration information is determined for the repeater based on the power headroom parameter associated with the repeater.

3. The repeater of claim 1, wherein the one or more power configuration parameters transmitted from the repeater to the controlling node comprise the current transmit power parameter associated with the repeater, wherein the gain configuration information is determined for the repeater based on the current transmit power parameter associated with the repeater.

4. The repeater of claim 1, wherein the one or more power configuration parameters transmitted from the repeater to the controlling node comprise the current gain setting value associated with the repeater, wherein the gain configuration information is determined for the repeater based on the current gain setting value associated with the repeater.

5. The repeater of claim 1, wherein the one or more power configuration parameters transmitted from the repeater to the controlling node comprise a maximum gain setting value associated with the repeater, wherein the gain configuration information is determined for the repeater based on the maximum gain setting value associated with the repeater.

6. The repeater of claim 1, wherein the one or more power configuration parameters transmitted from the repeater to the controlling node comprise a maximum output power value associated with the repeater, wherein the gain configuration information is determined for the repeater based on the maximum output power value associated with the repeater.

7. The repeater of claim 1, wherein the memory includes instructions executable by the processor to cause the repeater to transmit the one or more power configuration parameters to the controlling node based on a periodic schedule.

8. The repeater of claim 1, wherein the memory includes instructions executable by the processor to cause the repeater to detect an event trigger and transmit the one or more power configuration parameters to the controlling node in response to the event trigger.

9. The repeater of claim 8, wherein the instructions executable by the processor to cause the repeater to detect the event trigger comprise instructions executable by the processor to cause the repeater to:
detect a request from the controlling node for updated power configuration parameters;
detect satisfaction of an output power threshold condition; or
detect satisfaction of a gain setting threshold condition.

10. The repeater of claim 1, wherein the memory includes instructions executable by the processor to cause the repeater to:
determine a first set of power configuration parameters specific to a first communication beam;
determine a second set of power configuration parameters specific to a second communication beam, wherein the second set of power configuration parameters are different than the first set of power configuration parameters; and
transmit the first set of power configuration parameters, the second set of power configuration parameters, or both, to the controlling node.

11. The repeater of claim 1, wherein the memory includes instructions executable by the processor to cause the repeater to:
determine a first set of power configuration parameters specific to a first interface with the first communication device;
determine a second set of power configuration parameters specific to a second interface with the second communication device, wherein the second set of power configuration parameters are different than the first set of power configuration parameters; and
transmit the first set of power configuration parameters, the second set of power configuration parameters, or both, to the controlling node.

12. The repeater of claim 1, further comprising:
one or more receive antennas; and
one or more transmit antennas;
wherein the one or more receive antennas are configured to receive the communication as an analog millimeter wave signal based on receive beamforming;
wherein the instructions executable by the processor to cause the repeater to apply the gain value comprise instructions executable by the processor to cause the repeater to amplify the analog millimeter wave signal without performing analog-to-digital conversion of the analog millimeter wave signal; and
wherein the one or more transmit antennas are configured to transmit the amplified analog millimeter wave signal based on transmit beamforming.

13. The repeater of claim 1, wherein the repeater is a layer-1 millimeter wave repeater.

14. The repeater of claim 1, further comprising a power amplifier and a variable gain amplifier set based on the gain configuration information received from the controlling node.

15. The repeater of claim 1, wherein the gain configuration information received at the repeater from the controlling node explicitly specifies the gain value to be used by the repeater.

16. The repeater of claim 1, wherein the instructions executable by the processor to cause the repeater to determine the gain value comprise instructions executable by the processor to cause the repeater to:
determine whether the received communication is an uplink communication or a downlink communication; and
select the gain value based on the gain configuration information and the determination of whether the received communication is the uplink communication or the downlink communication.

17. The repeater of claim 16, wherein the instructions executable by the processor to cause the repeater to determine the gain value comprise instructions executable by the processor to cause the repeater to select the gain value differently when the received communication is the uplink communication than when the received communication is the downlink communication.

18. The repeater of claim 1, wherein the instructions executable by the processor to cause the repeater to determine the gain value comprise instructions executable by the processor to cause the repeater to determine the gain value based on the gain configuration information received from the controlling node and also based on one or more gain control factors determined locally at the repeater.

19. The repeater of claim 1, wherein the processor is configured to use a different radio access technology (RAT) to transmit the one or more power configuration parameters and receive the gain configuration information than the repeater uses to receive the communication and transmit the gain adjusted communication.

20. The repeater of claim 1, wherein the processor is configured to use a different frequency range within a same radio access technology (RAT) to transmit the one or more power configuration parameters and receive the gain configuration information than the repeater uses to receive the communication and transmit the gain adjusted communication.

21. The repeater of claim 1, wherein the processor is configured to use a different bandwidth part within a same frequency range of a same radio access technology (RAT) to transmit the one or more power configuration parameters and receive the gain configuration information than the repeater uses to receive the communication and transmit the gain adjusted communication.

22. The repeater of claim 1, wherein the controlling node is the first communication device, and wherein the first communication device is a base station.

23. A method of wireless communication performed by a repeater that relays communications between a first communication device and a second communication device, comprising:
determining one or more power configuration parameters associated with the repeater;
transmitting the one or more power configuration parameters from the repeater to a controlling node, wherein the one or more power configuration parameters transmitted from the repeater to the controlling node comprise a power headroom parameter associated with the repeater, a current transmit power parameter associated with the repeater, or a current gain setting value associated with the repeater;
receiving, at the repeater from the controlling node, gain configuration information determined for the repeater based on the power headroom parameter associated with the repeater, the current transmit power parameter associated with the repeater, or the current gain setting value associated with the repeater;
receiving a communication from the first communication device;
determining a gain value for the repeater based on the gain configuration information;
applying the gain value for the repeater to the received communication to create a gain adjusted communication; and
transmitting the gain adjusted communication from the repeater to the second communication device.

24. A method of wireless communication performed by a controlling node that communicates with a repeater, comprising:
receiving, at the controlling node from the repeater, one or more power configuration parameters associated with the repeater, wherein the one or more power configuration parameters received at the controlling node from the repeater comprise a power headroom parameter associated with the repeater, a current transmit power parameter associated with the repeater, or a current gain setting value associated with the repeater;
determining gain configuration information for the repeater based on the power headroom parameter associated with the repeater, the current transmit power parameter associated with the repeater, or the current gain setting value associated with the repeater; and
transmitting the gain configuration information from the controlling node to the repeater.

25. A controlling node that communicates with a repeater, comprising:
a processor; and
a memory coupled with the processor, wherein the memory includes instructions executable by the processor to cause the controlling node to:
receive, at the controlling node from the repeater, one or more power configuration parameters associated with the repeater, wherein the one or more power configuration parameters received at the controlling node from the repeater comprise a power headroom parameter associated with the repeater, a current transmit power parameter associated with the repeater, or a current gain setting value associated with the repeater;

determine gain configuration information for the repeater based on the power headroom parameter associated with the repeater, the current transmit power parameter associated with the repeater, or the current gain setting value associated with the repeater; and transmit the gain configuration information from the controlling node to the repeater.

26. The method of claim 25, wherein the controlling node is a base station, and wherein the memory includes instructions executable by the processor to cause the base station to:

communicate with a communication device through the repeater based on an application of the gain configuration information at the repeater.

27. The controlling node of claim 25, wherein the memory includes instructions executable by the processor to cause the controlling node to:

coordinate selection of a transmission power level for use at a first communication device together with a gain value to be applied at the repeater based on at least one of:
 a target receive power level at a second communication device for a signal transmitted from the first communication device through the repeater to the second communication device;
 a target transmitter power consumption level; or
 a target maximum interference level.

28. The controlling node of claim 25, wherein the memory includes instructions executable by the processor to cause the controlling node to:

receive a received power report from at least one of the repeater or a first communication device; and determine a path loss experienced between the first communication device and a second communication device through the repeater based on the received power report;

wherein the instructions executable by the processor to cause the controlling node to determine the gain configuration information for the repeater comprise instructions executable by the processor to cause the controlling node to select a gain value for use at the repeater based on the path loss determination and the one or more power configuration parameters associated with the repeater.

29. The controlling node of claim 25, wherein the memory includes instructions executable by the processor to cause the controlling node to:

determine a transmission power level used by a first communication device;

determine a received power level at a second communication device; and determine a path loss experienced between the first communication device and the second communication device through the repeater based on the transmission power level and the received power level;

wherein the instructions executable by the processor to cause the controlling node to determine the gain configuration information for the repeater comprise instructions executable by the processor to cause the controlling node to select a gain value for use at the repeater based on the path loss determination and the one or more power configuration parameters associated with the repeater.

30. The controlling node of claim 25, wherein the instructions executable by the processor to cause the controlling node to transmit the gain configuration information comprise instructions executable by the processor to cause the controlling node to specify a first gain value for use at the repeater for communications from a first communication device through the repeater to a second communication device and a second gain value, different than the first gain value, for use at the repeater for communications from the second communication device through the repeater to the first communication device.

* * * * *